Jan. 3, 1967    E. SCHMITT ETAL    3,295,576
CARRYING CASE, PARTICULARLY FOR PHOTOGRAPHIC CAMERAS
Filed Oct. 7, 1964
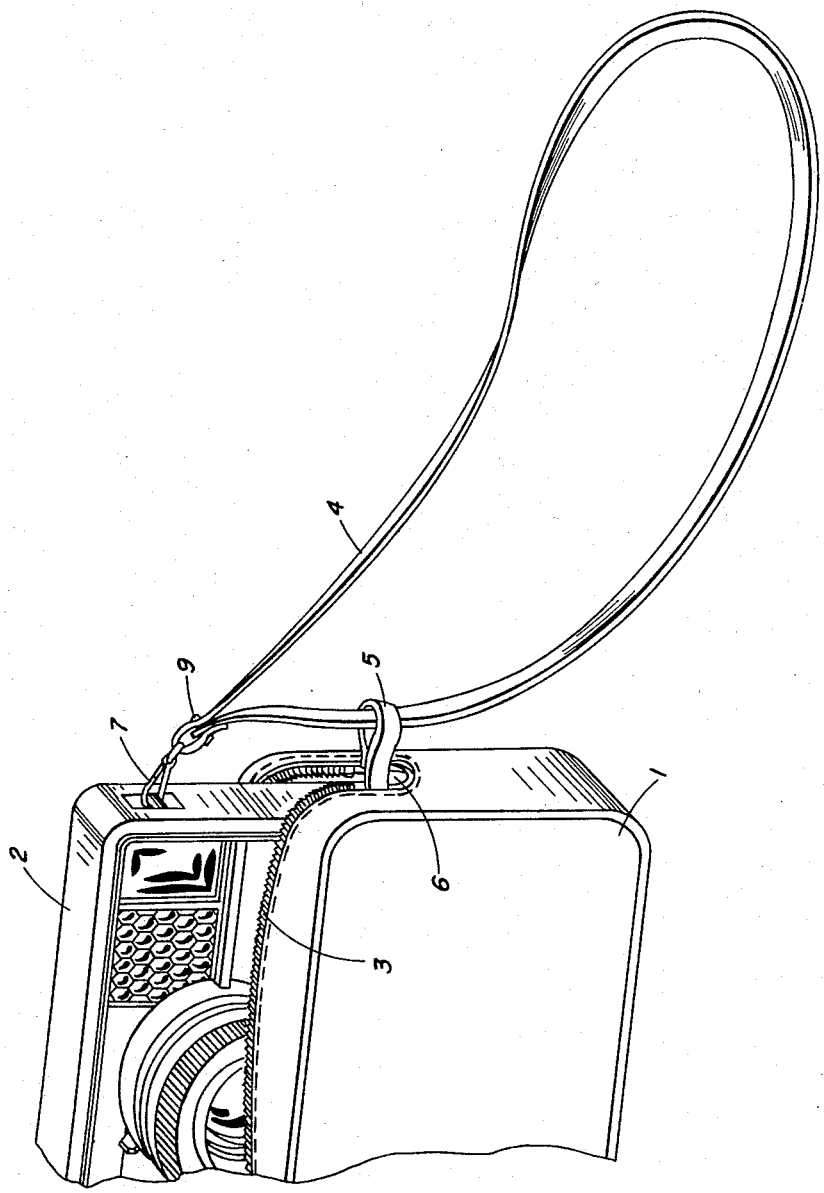
EUGEN SCHMITT
ERNST LIESER
INVENTORS
BY R. Frank Smith
ATTORNEYS

CARRYING CASE, PARTICULARLY FOR PHOTOGRAPHIC CAMERAS

Eugen Schmitt, Stuttgart, and Ernst Lieser, Stuttgart-Feuerbach, Germany, assignors to Eastman Kodak Company, Rochester, N.Y.
Filed Oct. 7, 1964, Ser. No. 402,082
Claims priority, application Germany, Oct. 23, 1963, K 46,079
4 Claims. (Cl. 150—52)

Present invention relates to a carrying case, particularly for cameras and preferably made of a soft material, which is provided with an opening that can be closed by means of a zip fastener or the like.

It is known to manufacture a case for photographic cameras, which has a carrying strap detachably fastened to the camera, said carrying strap extending through openings of the camera case. This type of case has the disadvantage that when the camera is taken out of the case for use a large part of the carrying strap is still within the area of the case so that this part of the carrying strap constitutes an obstacle when separating the camera from the case. Furthermore, the manufacture of such a case generally involves raised production costs since two eyelets must be provided in one wall of the case for inserting the carrying strap. Cases of this kind are preferably carried in such a manner that a large portion of the carrying strap is wound around the wrist. This manner of carrying the known case has the disadvantage that, due to the considerable distance between the two eyelets, the case cannot be safely carried since the carrying strap cannot be completely wound around the wrist.

A primary object of the present invention is to provide a carrying case, particularly for cameras, which overcomes the above-noted disadvantages of known camera cases in that the case is provided with an opening that can be closed by a zip fastener or the like, part of the slot remaining open in the closing direction of the zip fastener, this part being bridged by a strip which extends through the loop forming a portion of the camera carrying strap. Preferably, the carrying strap for the camera is in the form of a closed loop which is provided with means, e.g., a spring safety hook, by which it can be detachably connected to a corresponding eyelet provided in or on one wall of the camera. According to the present invention, the carrying case is designed so that when the camera is carried by the carrying strap the weight of the camera will not act on the strip bridging the open end of the closable opening of the case. For this purpose, the size of the strip is such that when the camera is in the closed case, the strip does not pull at the carrying loop.

The novel features that we consider characteristic of our invention are set forth with particularity in the appended claims. The invention itself, however, both as to its organization and its method of operation, together with additional objectives and advantages thereof, will best be understood from the following description of specific embodiments when read in connection with the accompanying drawing which shows in perspective our carrying case with a camera partially inserted into or removed therefrom.

Referring now in the drawing, the carrying case 1 according to the present invention may consist for instance of soft leather, or similar material, and having a size corresponding closely to the dimensions of the camera 2. An elongated slot or opening extends along a long narrow side and approximately half-way along each of the two adjacent short narrow sides of the camera, said slot or opening being closed almost completely by means of a zip fastener 3, or the like. Since the zip fastener 3 does not extend along the entire length of the slot, an opening 6 at the extreme end of the slot remains open in the closing direction of the zip fastener. The opening 6 is bridged by means of a strip 5 which, in conjunction with the case 1, takes the form of a closed loop. The strip 5 extends through a closed loop portion 4 of the strap for carrying the camera 2. The loop 4 of the carrying strap and the loop formed by the strip 5 have the same effect as two interlocking rings. For fastening the carrying strap to the camera 2 a spring safety hook 7 can be provided which is adapted to be detachably fastened to an eyelet, or the like, fixed in one side of the camera adjacent the top corner thereof.

The advantage of the carrying case according to the present invention over the known carrying cases consists in that the carrying loop 4 is disposed at the side of the camera; thus, for carrying the camera it is not only sufficient that the carrying loop 4 be of short length but that, in addition, after removing the camera 2 from the case, the distance of said case from the camera is large enough, in spite of the short length of the carrying loop, to guarantee an unimpeded operation of the camera. Since the carrying strap 4 is fastened to the camera 2 at one side only, such a case also has the advantage that when carrying the camera in the manner described, the carrying strap can be slung around the wrist in a more comfortable and safe manner.

Preferably, the length of the strip 5 is such that when the camera 2 is carried by the carrying strap 4, while the case is closed, the strip is not burdened by the weight of the camera.

Looking at the drawing it will be seen that the carrying strap 4 and the case 1 may be formed so as to be inseparable and can be sold as one unit. On the other hand, the case 2 with its looped strip 5 can be sold as a unit for use with a carrying strap 4 which can be sold separately therefrom providing the closing connection of the carrying strap designated at 9 is of the type that can be selectively opened and closed so that the carrying strap 4 can be extended through the loop formed by the strip 5 and thereafter connected in closed loop relation to interlock the two parts together.

While we have shown and described certain specific embodiments, we are aware that many modifications thereof are possible. For example, the invention is not limited to the use of a zip fastener but any suitable form of manually operated closing means, e.g., buttons and button holes, hooks and eyes, etc. could be used providing an opening, corresponding to opening 6 shown in the disclosed embodiment, remains after the case is closed. Likewise, the strip 5 could be fixed to the case at only one end and be detachably connected thereto at the other to allow it to be inserted through the closed loop 4 of the carrying strap if the same were not capable of being opened as mentioned. Our invention, therefore, is not to be restricted to the specific structure shown and described but is intended to cover all embodiments coming within the group of the appended claims.

We claim:
1. In combination
(1) a case for an article of manufacture provided with an elongated closable opening through which said article can be inserted into and removed from said case and which can be closed by drawing the edges thereof together;
(2) manually operable closure means for selectively closing said opening except for one extreme end of said opening which remains open when said elongated opening is closed by said closure means;

(3) a carrying strap adapted to be attached to said article of manufacture and including a closed loop portion; and (4) a strip of material fastened to opposite sides of and bridging said extreme end of said elongated opening and extending through the closed loop portion of said carrying strap.

2. The combination case and carrying strap according to claim 1, in which said manually operable closure means comprises a zip fastener which terminates short of the end of said elongated opening in the closing direction of said fastener to provide said open end of said elongated opening which is bridged by said strip of material.

3. The combination case and carrying strap according to claim 1 characterized in that the length of said strip of material is such that when the article is carried by said carrying strap, while the case is closed, it is not burdened by the weight of the article.

4. A carrying case for a photographic camera having a carrying strap adapted to be attached to one point on the edge of said camera and including a closed loop portion, and comprising a case having an elongated closable opening through which said camera can be inserted into and removed from said case and which can be closed by drawing the edges thereof together; a manually operable closure means for selectively closing said opening except for one extreme end which remains open when said elongated opening is closed by said closure means; and a strip of material adapted to be fastened to opposite sides of and bridging said extreme end of said opening to form a loop extending through said loop portion of said carrying strap.

References Cited by the Examiner

UNITED STATES PATENTS 2,769,475  11/1956  Fisher _____ 150—33

FOREIGN PATENTS 1,222,391  1/1960  France.